Patented May 26, 1942

2,284,118

UNITED STATES PATENT OFFICE 2,284,118

AMINOMETHYL DERIVATIVES OF P-HYDROXYBENZOIC ACID SALTS AND AMIDES

Louis H. Bock, Huntingdon Valley, Pa., assignor to Rohm & Haas Company, Philadelphia, Pa.

No Drawing. Application April 22, 1941, Serial No. 389,750

5 Claims. (Cl. 260—501)

This invention relates to new condensation products of p-hydroxy-benzoic acid salts and amides with formaldehyde and strongly basic secondary amines. This application is a continuation-in-part of my application Serial No. 272,133, filed May 6, 1939 which, on December 2, 1941, issued as U. S. Patent 2,264,358.

In the reaction of a phenol with formaldehyde and a strongly basic secondary amine it had been reported that, when the phenol possessed acidic substituents such as sulfonic, aldehydro, or carboxyl groups, the desired condensation did not occur. In general, this appeared to be true but it is now found, contrary to this generalization, that various series of interesting new products are obtainable from para-hydroxy-benzoic acid, its salts and amides including the N-substituted amides. This is all the more unexpected in view of the fact that salicylic acid and its esters and amides do not thus condense.

The condensation of p-hydroxy-benzoic acid, its salts and its amides, formaldehyde and a strongly basic, non-aromatic secondary amine may be conducted in the presence or in the absence of solvents. Suitable proportions of reactants are mixed and warmed while the mixture is stirred. In place of formaldehyde there may be used one of the simple polymers of formaldehyde, such as para-formaldehyde. Such materials are, as is well known, equivalent to formaldehyde. It thus becomes possible to use anhydrous reagents, if desired, and to remove water of condensation during the course of the reaction.

The amines which react to give condensation products with formaldehyde and p-hydroxy-benzoic acid, its salts and its amides include secondary amines of the aliphatic, alicyclic, and heterocyclic series, such as dimethylamine, diethylamine, dibutylamine, diamylamine, diallylamine, methyl dodecylamine, dicyclohexylamine, morpholine, piperidine, piperazine, pyrrolidine, diethanolamine, triethylene tetramine, and the like.

The para-hydroxy-benzoic acid amide used in the condensation may be the simple acid amide or one of the substituted amides containing one or more N-substituents, such as aliphatic, alicyclic, aryl, or aryl alkyl groups. As a salt there may be used a metal salt, an ammonium salt, or an amine salt.

When one mol of p-hydroxy-benzoic acid, its salt or its amide is reacted with about one mol of formaldehyde and about one mol of a secondary amine, the resulting compound has the general formula

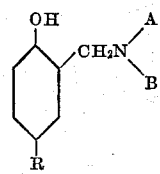

wherein R represents an acid amide or mono- or di-substituted amide group, —CONR$_1$R$_2$, (R$_1$ and R$_2$ being hydrogen or hydrocarbon) or a carboxylic acid salt group, —COM or —COH.amine (M representing a metallic ion), and A and B represent members of the group consisting of aliphatic hydrocarbon groups and divalent groups which jointly with the nitrogen form a heterocyclic ring.

Typical examples of compounds of this type are represented by the following:

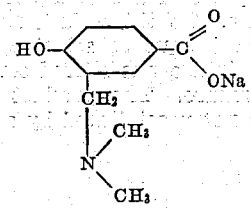

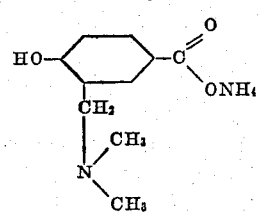

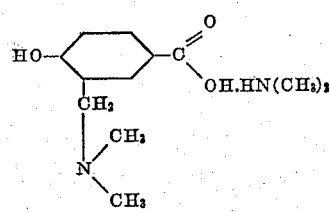

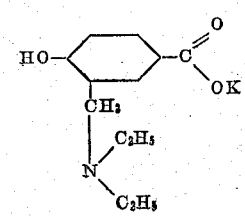

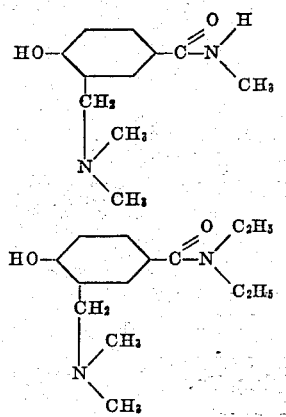

It is possible to introduce two methylene amine groups into the p-hydroxy-benzoic acid nucleus to obtain such a product as

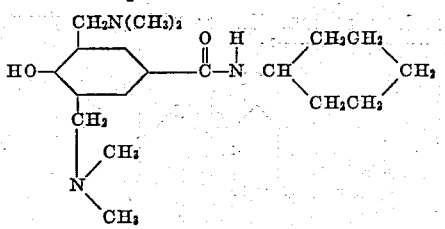

In this case at least two mol equivalents of formaldehyde and of secondary amine are reacted with one mol equivalent of the p-hydroxy-benzoic acid, its salt or amide.

Further details of the preparation of typical condensates will be found in the following illustrative examples, in which the parts given are by weight.

*Example 1*

27 parts of p-hydroxy-benzoic acid was dissolved in 80 parts of a 25% aqueous solution of dimethylamine. To this solution was added 16 parts of a 37% aqueous solution of formaldehyde. The mixture was stirred several hours at room temperature. The product is soluble in water and is not precipitated by acidifying with hydrochloric acid. On evaporating under vacuum, a taffy-like solid was obtained which was the dimethylamine salt of 3-dimethylaminomethyl-4-hydroxybenzoic acid. By warming this salt with caustic soda solution, the amine was driven off with the formation of the sodium salt.

*Example 2*

A mixture consisting of 10 parts of the cyclohexylamide of p-hydroxy-benzoic acid, 10 parts of a 30% aqueous solution of formaldehyde, 20 parts of a 25% aqueous solution of dimethylamine and 50 parts of methanol was stirred at 50° C. for six hours. The solution was vacuum-concentrated to liquid, which was insoluble in water but soluble in dilute acetic acid.

These new compounds may be used as wetting, emulsifying, and penetrating agents. Amides derived from amines of high molecular weight are useful as detergents and emulsifying agents. Other possible uses include textile finishing agents, dye assistants, bactericides, mothicides, etc. As shown in co-pending applications Serial Nos. 248,196 and 254,884, compounds of this type are useful for insolubilizing starch and other sizing materials and, in the case of the higher molecular members, for water-proofing textile fabrics.

I claim:

1. A compound selected from the group consisting of 4-hydroxybenzoic acid salts and amides in which at least one of the hydrogen atoms ortho to the phenolic hydroxyl group is replaced by a non-aromatic tertiary aminomethyl group.

2. A compound selected from the group consisting of 4-hydroxybenzoic acid salts and amides in which at least one of the hydrogen atoms ortho to the phenolic hydroxyl group is replaced by a dimethylaminomethyl group.

3. The dimethylamine salt of 3-dimethylaminomethyl-4-hydroxybenzoic acid.

4. The sodium salt of 3-dimethylaminomethyl-4-hydroxybenzoic acid.

5. 3-dimethylaminomethyl-4-hydroxy-cyclohexylamido benzene.

LOUIS H. BOCK.